United States Patent
Sangoi et al.

(10) Patent No.: US 10,943,263 B2
(45) Date of Patent: Mar. 9, 2021

(54) SYSTEM, METHOD, AND COMPUTER-READABLE MEDIUM FOR PROVIDING OPTIMAL DYNAMIC CONTENT OF A SERVICE TO A USER

(71) Applicant: MERU MOBILITY TECH PRIVATE LIMITED, Mumbai (IN)

(72) Inventors: Nilesh Sangoi, Mumbai (IN); Suryaganesh Sastry, Mumbai (IN)

(73) Assignee: MERU CAB COMPANY PRIVATE LIMITED, Mumbi (IN)

( * ) Notice: Subject to any disclaimer, the term of this patent is extended or adjusted under 35 U.S.C. 154(b) by 24 days.

(21) Appl. No.: 15/517,573

(22) PCT Filed: Mar. 16, 2017

(86) PCT No.: PCT/IB2017/051541
§ 371 (c)(1),
(2) Date: Apr. 7, 2017

(87) PCT Pub. No.: WO2018/115982
PCT Pub. Date: Jun. 28, 2018

(65) Prior Publication Data
US 2018/0293625 A1    Oct. 11, 2018

(30) Foreign Application Priority Data
Dec. 21, 2016 (IN) .............................. 201621043757

(51) Int. Cl.
G06Q 30/02 (2012.01)
G06Q 30/06 (2012.01)
H04L 29/08 (2006.01)

(52) U.S. Cl.
CPC ..... *G06Q 30/0267* (2013.01); *G06Q 30/0283* (2013.01); *G06Q 30/0601* (2013.01); *G06Q 30/0611* (2013.01); *H04L 67/16* (2013.01)

(58) Field of Classification Search
None
See application file for complete search history.

(56) References Cited

U.S. PATENT DOCUMENTS 9,305,310 B2 * 4/2016 Radhakrishnan .. G06Q 30/0283
9,959,512 B2 * 5/2018 Camp ................ G06Q 30/0202
(Continued)

OTHER PUBLICATIONS

The Rideshare Guy, How to Use the Uber Driver App, May 18, 2016, Document contains captured images of video found on YouTube (https://www.youtube.com/watch?v=WzlglX8rbwg) (Year: 2016).*

(Continued)

*Primary Examiner* — Naresh Vig
(74) *Attorney, Agent, or Firm* — Workman Nydegger

(57) ABSTRACT

The disclosure relates to a method, system, and computer-readable medium for providing optimal dynamic content of a service by receiving a first set of parameters and a second set of parameters pertaining to the service by a central controller; determining a dynamic content for the service based on the first and the second sets of parameters; transmitting the dynamic content to at least one service delivery terminal; transmitting the dynamic content to a controller when the dynamic content is accepted by the at least one service delivery terminal, transmitting modified dynamic content to the central controller when the dynamic content is not accepted; receiving a request for availing the service; comparing the request and one of the dynamic content and the modified dynamic content to obtain the optimal dynamic content, and transmitting the obtained optimal dynamic content to the end-user.

20 Claims, 11 Drawing Sheets

(56) References Cited

U.S. PATENT DOCUMENTS

| | | | |
|---|---|---|---|
| 10,067,988 B2* | 9/2018 | Choksi | G06Q 40/12 |
| 10,215,574 B2* | 2/2019 | Cun | G01C 21/367 |
| 10,395,333 B2* | 8/2019 | Dicker | G06Q 30/0208 |
| 2003/0120526 A1 | 6/2003 | Altman et al. | |
| 2006/0059023 A1 | 3/2006 | Mashinsky | |
| 2008/0126143 A1 | 5/2008 | Altman et al. | |
| 2009/0030885 A1 | 1/2009 | DePasquale et al. | |
| 2011/0258006 A1 | 10/2011 | Koetting et al. | |
| 2012/0101858 A1 | 4/2012 | Depasquale et al. | |
| 2012/0101901 A1 | 4/2012 | DePasquale et al. | |
| 2013/0268406 A1* | 10/2013 | Radhakrishnan | G06Q 30/0283 705/26.61 |
| 2014/0122239 A1 | 5/2014 | DePasquale et al. | |
| 2014/0129951 A1* | 5/2014 | Amin | G06Q 50/30 715/738 |
| 2017/0038948 A1* | 2/2017 | Cun | G06F 3/017 |
| 2017/0193404 A1* | 7/2017 | Yoo | G06Q 10/02 |
| 2019/0266518 A1* | 8/2019 | Medina | G01C 21/3697 |

OTHER PUBLICATIONS

Harry Campbell, How to Use the Uber App—Maximum Ridesharing Profits, Sep. 20, 2016, MaximumRideSharingProfits.com (Year: 2016).*

International Search Report and Written Opinion for PCT/IB2017/051541 dated Aug. 6, 2017.

* cited by examiner

US 10,943,263 B2

SYSTEM, METHOD, AND COMPUTER-READABLE MEDIUM FOR PROVIDING OPTIMAL DYNAMIC CONTENT OF A SERVICE TO A USER

CROSS REFERENCE TO RELATED APPLICATIONS

This application is the National Stage of International Application No. PCT/IB2017/051541 filed Mar. 16, 2017 and claims benefit of Indian Application No. 201621043757 filed on Dec. 21, 2016.

TECHNICAL FIELD

The present disclosure generally relates to the field of discovery of a real-time service in a network and is more specifically directed to a system and method for providing optimal dynamic content of the real-time service to one or more users in a network.

INTRODUCTION

In present times, online applications running on a computing device are capable of serving most needs of an individual. These needs could be varied from availing online social entertainment to real-World services. When a user avails one or more such services using an application, the content of the service fetched by the application is usually based on a predefined/prefetched set of rules, instructions, or manual updates. For instance, calling a cab by the user using an app-based cab service controlled by a service aggregator, wherein the service aggregator is a cab company which aggregates the requests for booking the cabs from multiple users, centrally control and/or monitor the cabs for providing the services, determines the rate for the cab services, and gets the cabs dispatched to the users through service delivery peers. Further, the rates of the cab may be dynamically varied by the service aggregator based on factors such as time of the day, location, and availability of the cab in a particular location. In the existing system, the service aggregators are responsible for determining the rules for setting and regulating the content of the requested services, such as the price. The service delivery peers, practically are the only source to decide the content for the service depending upon the characteristics of the service which is being offered. However, the outgoing systems do not allow the service delivery peers to decide the content or the rules for the content related to the service which is being offered.

Further, there is a lack of transparency in the present systems for defining rules for regulating the content for the services as the delivery peers are not necessarily provided with the information pertaining to the service. Accordingly, the conventional mechanisms do not have the ability to allow the service delivery peers employed for delivering the services to regulate the content of the at least one service, such as to fix or maintain the prices related to a service.

In light of the aforementioned drawbacks inherent in the existing art, there exists a need for developing an improved, integrative, and transparent system that allows for dynamic content delivery of the services and thereby allowing the service delivery peers to decide the content for the services being offered by the service delivery peers.

The approaches described above are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE DISCLOSURE

This section is provided to introduce certain objects and aspects of the disclosed methods and systems in a simplified form that are further described below in the detailed description. This summary is not intended to identify the key features or the scope of the claimed subject matter.

In view of the shortcomings of existing methods and systems, as discussed in the introduction, it is apparent that there exists a need for developing an efficient and user-friendly service content provider system, method, and computer-readable medium that not only overcomes the problems inherent in the prior arts but are also advantageously used to customize the content of the service by every service delivery peer connected to the network. It is, further, an object of the present disclosure to provide a method, system, and computer-readable medium that are capable of not only providing dynamic content of the service from one or more service delivery peers and service aggregators to the end-users but also to dynamically determine recommended content for the service, and thus, ensuring flexibility and transparency between service aggregators, delivery service peers, and the end-users.

More particularly, the object of the present disclosure is to provide a method, system, and computer-readable medium for improving the service content providing system to enable service delivery peers to decide the content for the services based on the characteristics of the services they provide and to determine content recommended for a service for the service delivery peers and end-users. Yet another object of the present disclosure is to provide a reliable method, system, and computer-readable medium for displaying the details of dynamic content fetched in real-time from multiple service delivery peers who provide the service to end-users.

According to embodiments of the present disclosure, a method for providing at least one optimal dynamic content of at least one service is disclosed. One method comprising: receiving a first set of parameters from at least one service delivery terminal and a second set of parameters from at least one content server, wherein the first set of parameters and the second set of parameters are at least one of received in real-time and received periodically; determining the at least one dynamic content of the at least one service based on the first set of parameters and the second set of parameters, wherein the at least one dynamic content is one of at least one price range, at least one recommended price, and a combination thereof, and wherein the at least one price range has an upper threshold and a lower threshold; transmitting the at least one dynamic content to the at least one service delivery terminal by a central controller; transmitting the at least one dynamic content to the central controller when the at least one dynamic content is accepted by the at least one service delivery terminal over a network; transmitting at least one modified dynamic content to the central controller by the at least one service delivery terminal over the network when the at least one dynamic content is modified; receiving at least one request from at least one user device for using the at least one service by the central controller; comparing the at least one request and one of (i) the at least one dynamic content and (ii) the at least one modified dynamic content to determine at least one optimal dynamic content; and transmitting the at least one optimal dynamic content to the at least one user device over the network.

Further, according to embodiments of the present disclosure, a system for providing at least one dynamic content of at least one service is disclosed. One system comprising, a central controller configured to: receive a first set of parameters from at least one service delivery terminal and a second set of parameters from at least one content server wherein the first set of parameters and the second set of parameters are at least one of received in real-time and received periodically; determine the at least one dynamic content of the at least one service based on the first set of parameters and the second set of parameters, wherein the at least one dynamic content is one of at least one price range, at least one recommended price, and a combination thereof, and wherein the at least one price range has an upper threshold and a lower threshold; and transmit the at least one dynamic content to the at least one service delivery terminal by a central controller; and a service provider terminal configured to: receive and exhibit the at least one dynamic content from the central controller; transmit the at least one dynamic content to the central controller when the at least one dynamic content is accepted; and transmit at least one modified dynamic content by modifying the at least one dynamic content when the at least one dynamic content received from the central controller is not accepted, wherein the central controller is further configured to: receive at least one request from at least one user device for using the at least one service; compare the at least one request and one of (i) the at least one dynamic content and (ii) the at least one modified dynamic content to determine at least one optimal dynamic content; and transmit the at least one optimal dynamic content to the at least one user device over a network.

According to embodiments of the present disclosure, a non-transitory computer-readable medium storing instructions that, when executed by a computer, cause the computer to perform a method for providing at least one optimal dynamic content of at least one service is disclosed. One method of the computer-readable medium including: receiving a first set of parameters from at least one service delivery terminal and a second set of parameters from at least one content server, wherein the first set of parameters and the second set of parameters are at least one of received in real-time and received periodically; determining the at least one dynamic content of the at least one service based on the first set of parameters and the second set of parameters, wherein the at least one dynamic content is one of at least one price range, at least one recommended price, and a combination thereof, and wherein the at least one price range has an upper threshold and a lower threshold; transmitting the at least one dynamic content to the at least one service delivery terminal by a central controller; transmitting the at least one dynamic content to the central controller when the at least one dynamic content is accepted by the at least one service delivery terminal over a network; transmitting at least one modified dynamic content to the central controller by the at least one service delivery terminal over the network when the at least one dynamic content is modified; receiving at least one request from at least one user device for using the at least one service by the central controller; comparing the at least one request and one of (i) the at least one dynamic content and (ii) the at least one modified dynamic content to determine at least one optimal dynamic content; and transmitting the at least one optimal dynamic content to the at least one user device over the network.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated herein, and constitute a part of this present disclosure, illustrate exemplary embodiments of the disclosed methods and systems in which like reference numerals refer to the same parts throughout the different drawings. Some drawings may indicate the components using block diagrams and may not represent the internal circuitry of each component. It will be appreciated by those skilled in the art that drawings of the present disclosure include disclosure of electrical components or circuitry commonly used to implement such components.

Figure 1:
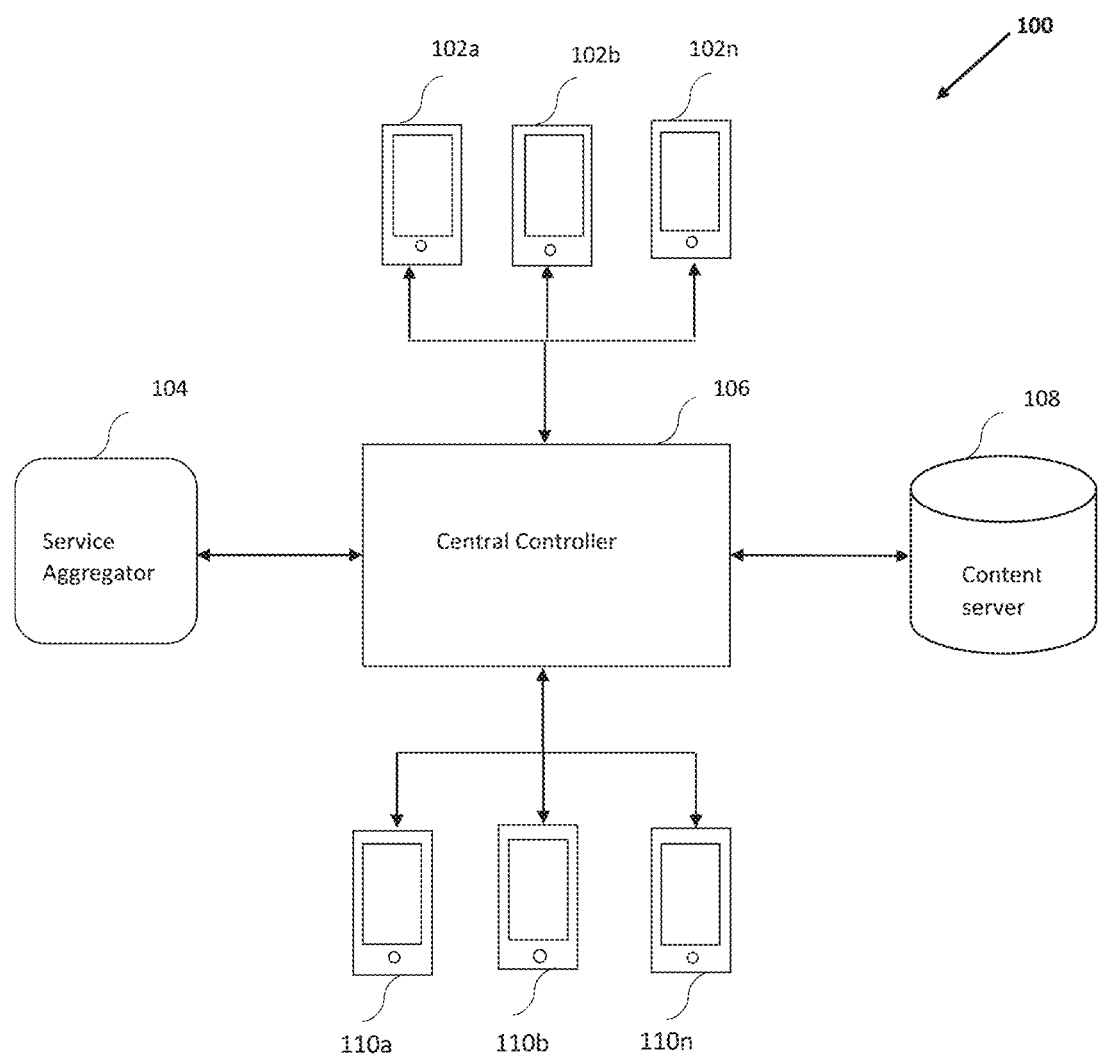
FIG. 1 illustrates an exemplary system for providing optimal dynamic content of a service, in accordance with an exemplary embodiment of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

The following description of example methods, systems, and computer-readable media is not intended to limit the scope of the description to the precise form or forms detailed herein. Instead in the following description, for the purposes of explanation, various specific details are set forth in order to provide a thorough understanding of the disclosed embodiments. It will be apparent, however, that the disclosed embodiments may be practiced without these specific details.

Several features described hereafter can each be used independently of one another or with any combination of other features. However, any individual feature may not address any of the problems discussed in the introduction or might address only some of the problems discussed therein.

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

For the sake of brevity, conventional techniques related to systems and servers used to perform embodiments of the present disclosure and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure relates to methods, systems, and computer-readable media for providing optimal dynamic content of a real-time service to one or more users in a network.

As used herein below, a "service aggregator" includes entities which act as a mediator party between the end-users and the delivery peers, wherein the mediator party collects the service request and/or additional information from the end-users, and subsequently relay the same to the delivery peers which provide the service and vice-versa.

As used herein below, a "service delivery peer" includes entities which receive the service requests from the end-user via the service aggregator and accordingly provide the requested content for said service to the service aggregator which in turn is provided to the user. The content may include, but is not limited to, price and/or cost estimates for the service to be charged from the end-user along with details based on the characteristics of the service provided such as the quality of the service and the time taken to start/initiate the service by the service delivery peer.

As used herein below, a "network" refers to any medium that connects one or more components/units/cable wires within or to any external system encompassed by the present disclosure. The network may be a wired network, a wireless network, or a combination thereof. The network may include, but is not limited to, a personal area network, a local area network, a metropolitan area network, a wide area network, or any combination thereof.

As used herein below, "connect", "configure", "couple" and its cognate terms, such as "connects", "connected", "configured" and "coupled" may include a physical connection, either wired connection or wireless connection, or a combination of such connections, as may be obvious to a person skilled in the art.

Multiple service delivery peers are available to deliver one or more services to users within a specific geographical location requesting for one or more services at a given point of time. The one or more services may include a cab service, a plumbing service, a laundry service, a service for booking bus seats, or any service based on demand and supply. The service delivery peers make their availability known to a service aggregator which receives one or more requests from users for availing the services. The present disclosure encompasses a system, method, and computer-readable media which computes at least one dynamic content including recommended content values, such as a price value for a service, and provides the same to the service delivery peers. The service delivery peers are open to accept the at least one dynamic content determined by the system or to provide at least one new content value for the at least one dynamic content. In either scenario, the system is enabled to fetch the content values accepted or modified by the service delivery peers, transmit the content values and the service peer details to the end-users to make a selection of the service delivery peer as per the content provided, capture the selection made by the end-users and deliver the request made by the end-user to the corresponding service delivery peer over the network.

FIG. 1 illustrates a general overview of the system architecture wherein the system [100] includes different components working together in accordance with the present disclosure to provide dynamic content of a real-time service(s) to end-user(s) in a network. Also, the system [100] and its components/units are organized/arranged in such a manner that they are capable of enabling service delivery peers to set the contents of a service in real-time and providing the dynamic contents to the end-users availing the service.

The system architecture, illustrated in FIG. 1, for providing dynamic content of the real-time service to one or more users in a network is implemented through a specialized arrangement of structural components capable of executing the desired functionalities as described herein below. More particularly, the system [100] includes service delivery terminals [102] being operated by one or more service providers, a service aggregator [104], a content server [108], and user devices [110], wherein the service delivery terminals [102], the service aggregator [104], the content server [108], and the user devices [110] are connected to the central controller [106] over a network. Further, the service provider terminals [102] and the user devices [110] are connected to the central controller [106] over a network.

The service delivery terminal [102] and the user devices [110] may be portable electronic devices including, but is not limited to, a cellular phone, a tablet computer, a Personal Digital Assistant (PDA) device, a smart-phone, a Portable Navigation Device (PND), a wireless device, a mobile device, a handheld device, a mobile route guidance device, a mobile data terminal, etc. The service delivery terminals [102] and the user devices [110] have an input/output (I/O) interface which may include a variety of software and hardware interfaces, for example, a web interface, a graphical user interface, etc. The I/O interface may allow the service delivery terminals [102] to interact with a service delivery peer and the user devices [110] to interact with the user directly. Further, the I/O interface may enable the service delivery terminals [102] and user devices [110] to communicate with other computing devices, such as the central controller [106], and with each other. The I/O interface can facilitate multiple communications within a wide variety of networks and protocol types, including wired networks (e.g. LAN, cable networks, etc.) and wireless networks (e.g., WLAN, cellular networks, satellite networks, etc.).

The central controller [106] may include at least one processor and a memory. The present disclosure encompasses having one or more microprocessors, microcomputers, microcontrollers, digital signal processors, central processing units, state machines, logic circuitries, and/or any devices that manipulate signals based on operational instructions. Among other capabilities, the at least one processor may be configured to fetch and execute computer-readable instructions stored in the memory. The memory may include any non-transitory computer-readable medium or computer program product known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory may include modules and data.

In one implementation, the central controller [106] is configured to receive the first set of parameters from at least one service delivery peer and a second set of parameters from the control server [108]. The first set of parameters include information about the service offered by the at least one service delivery peer such as, but not limited to, the availability of the at least one service delivery terminal at a particular location, price for the at least one service quoted by the at least one service delivery terminal, distance between the at least one service delivery terminal and the at least one user device, rating of the at least one service delivery terminal. In one embodiment, in case of a cab service, the first set of parameters may include information about the availability of at least one cab driver at any location, price for the service such as rate per kilometer, distance between the at least one cab driver and an end-user, i.e., minimum distance between the at least one cab driver and the end-user that the at least one cab driver is ready to cover to initiate the service, rating of the at least one cab driver, the type of the cab available with the at least one cab driver, and the closeness to a drop location, wherein the at least one cab driver may provide a location of interest and the closeness of the drop location is seen with respect to the location of interest and not the current location of the at least cab driver. The second set of parameters includes information about analysis of demand and service gap for a service at said particular location, content, such as price previously accepted by end-users for a service, intra-day shift in the demand and supply due to local conditions, supply of the one or more available service delivery peers, events which may impact estimation of at least one dynamic content and custom rules. The central controller [106] is configured to receive the first set of parameters and/or the second set of parameters in real-time and/or at a periodic interval, wherein the period of time may be predefined.

On receiving the first set of parameters and the second set of parameters, the central controller [106] is further configured to determine at least one dynamic content based on the first set of parameters and the second set of parameters so received. The central controller [106] determines the at least one dynamic content using a content estimator module, a content finalizer module, and a corrector module. The at least one dynamic content may include, but is not limited to, at least one price range, at least one recommended content value, such as a price value, detail about quality or quantum of the service. In an embodiment, the at least one dynamic content may also include ratings of the available service delivery peers and the expected time to be taken to initiate the service delivery. The central controller [106] is further configured to transmit the at least one dynamic content to the at least one service delivery terminal [102]. The at least one service delivery terminal [102] is configured to receive the at least one dynamic content from the central controller [106].

Further, using the at least one service delivery terminal [102], the at least one service delivery peer accepts the at least one dynamic content transmitted by the central controller [106]. Alternatively, the service delivery terminal [102] is configured to enable the at least one service delivery peer to provide at least one dynamic content by modifying the at least one dynamic content for the service based on a set of factors including current location of an end-user, proximity between the end-user and the at least one service delivery peer at the time a request for service comes, time of the day, pick up location and destination location in case of cab service, expected effort and expected cost to be incurred by the at least one service delivery peer and a demand and supply gap provided to the service delivery terminal [102]. In one embodiment, in case of a cab service, the at least one content provided by the at least one service delivery peer through the service delivery terminal [102] may include, but is not limited to, price for the service and preferences, such as the maximum distance from a location of interest that the at least one service delivery peer is willing to travel to drop an end-user, wherein the location of interest is provided by the service delivery peer, distance of pick up location from the at least one service delivery peer's location at the time of a request, validity time etc. In addition, where the at least one content relates to a price of a service, the at least one service delivery peers provide at least one modified dynamic content on the basis of the at least one dynamic content provided to the service delivery terminal [102] by the central controller [106], such as the upper and lower limits of the price and a current average price value and a recommended price value to be charged for the service, wherein the upper and lower limits may be regulated by bodies such as the Government or by the service delivery peers themselves. In an embodiment, the at least one dynamic content is provided by the owner of the service delivery resource such as in the case of a cab booking service, by the owner of the cab and not the driver of the cab who actually delivers the service. In an embodiment, the content of service may be based on inputs which could be modified by the central controller [106], the at least one service delivery peer and/or the service aggregator [104] to whom the at least one service delivery peer is attached to.

The service delivery terminal [102] is further configured to transmit the at least one dynamic content or the at least one dynamic modified content provided by the at least one service delivery peer to the central controller [106].

The central controller [106] is further configured to receive a request for availing at least one service by at least one end-user through at least one user device [110]. In one embodiment, the at least one end-user may send a request for availing at least one real-time service. In an embodiment, the end-user may provide one or more constraints for the at least one service or the at least one service delivery peer along with the request, wherein the constraints include, but is not limited to, price estimate for the service, quality of the service provided by the at least one service delivery terminal. In another embodiment, the at least one end-user may request for the at least one service instantly to avail the at least one service or pre-book the at least one service in advance.

On receiving the request from the at least one end-user, the central controller [106] is configured to perform a comparison function using a comparison engine between the at least one dynamic content determined by the central controller [106] or the at least one modified dynamic content with the constraints provided by the at least one end-user through the user device [110], and accordingly, display the at least one optimal dynamic content found to the user device [110].

Subsequently, the end-user is then provided with the at least one optimal dynamic content by the central controller [106] such that the at least one end-user is enabled to make a selection on the at least one optimal dynamic content transmitted by the central controller [106]. In one embodiment, the central controller is configured to analyse data pertaining to one or more selections made by the at least one end-user for one or more requests for availing at least one service, and the customer preferences made for the at least one end-user in order to render the at least one optimal dynamic content to the at least one end-user at a future date based on identified preferences.

Figure 2:
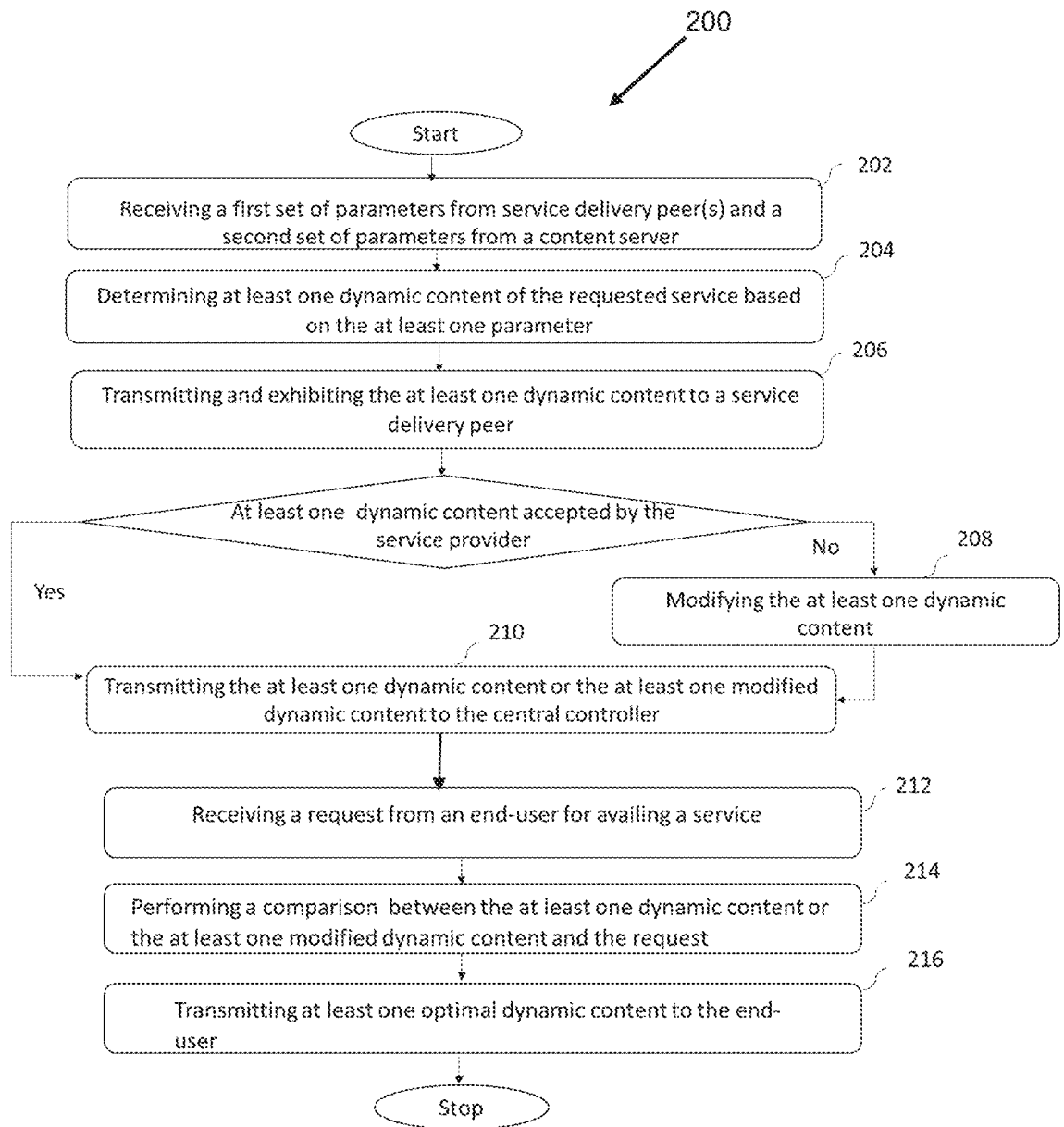
FIG. 2 illustrates an exemplary method for providing optimal dynamic content of a service, in accordance with an exemplary embodiment of the present disclosure.

FIG. 2 illustrates a step by step mechanism for providing dynamic content related to a service, in accordance with exemplary embodiments of the present disclosure. The method of FIG. 2 implements the system for providing dynamic content related to the service illustrated in FIG. 1. In one embodiment, the method of FIG. 2 implements the system for providing dynamic content related to a real-time service. Delivery of content related to the service is implemented through the use of central controller [106] by receiving a first set of parameters and a and second set of parameters including parameters such as demand and supply analysis for the service for computing dynamic content related to the service including recommended content, providing service delivery peers with the computed information, i.e., the dynamic content, gathering dynamic content from the service delivery peers, wherein the dynamic content gathered is either the dynamic content accepted by the service delivery peer or the dynamic content modified by the service delivery peer, gathering all the requests for services from end-users and subsequently providing the end-users with the optimal dynamic content related to the services.

In an embodiment, the method 200 may initiate in an event the central controller [106] receives information about the availability of at least one service delivery peer present in a location.

The method begins at step 202, wherein the central controller [106] receives the first set of parameters from the at least one service delivery peer and a second set of parameters from a control server [108]. The first set of parameters include information about the service offered by the at least one service delivery peer such as, but not limited to, the availability of the at least one service delivery peer at a particular location, distance between the at least one service delivery peer and the end-user that the at least one service delivery peer is ready to cover to initiate the service, the price for the service quoted by the at least one service delivery peer, and the closeness to a drop location in case of a cab service, wherein the at least one cab driver may provide a location of interest and the closeness of the drop location is seen with respect to the location of interest and not the current location of the at least cab driver. The second set of parameters includes information about analysis of demand and service gap for a service at said particular location, content such as price previously accepted by end-users for the service, intra-day shift in the demand and supply due to local conditions, supply of the one or more available service delivery peers, events which may impact estimation of at least one dynamic content, and custom rules. The receiving of the first set of parameters and/or the second set of parameters may happen in real-time and/or at a periodic interval, wherein the period of time may be predefined. The first set of parameters and/or the second set of parameters may be received by the central controller [106] in real-time and/or after periodic intervals, wherein the period of time is predefined. In one embodiment, the second set of parameters may be stored in a memory in the central controller [106].

At step 204, the at least one dynamic content for the service is determined by the central controller [106] using the first set of parameters and the second set of parameters received at step 202. The at least one dynamic content is determined using a content estimator module, a content finalizer module, and a corrector module present in the central controller [106]. In one embodiment, the content estimator module, the content finalizer module, and the corrector module may be present in the content server [108]. The at least one dynamic content may include, but is not limited to, a recommended value for a content, such as a recommended price, at least one price range with lower and upper thresholds, detail about quality or quantum of a service, demand data for the service at the service delivery peer's current location, ratings of the available service delivery peers, and the expected time to be taken to initiate the service delivery.

At step 206, the at least one dynamic content is transmitted by the central controller [106] to the at least one service delivery peer through the at least one service delivery terminal [102]. The at least one service delivery terminal [102] then receives the at least one dynamic content from the central controller [106].

Subsequently, at step 208, using the service delivery terminal [102], the at least one service delivery peer is capable of selecting and accepting the at least one dynamic content such as recommended price provided by the central controller [106] to the service delivery peer. Alternatively, the service delivery peer is capable of modifying the at least one dynamic content for the service based on a set of factors including, but not limited to, the at least one dynamic content provided by the central controller [106] to the service delivery peer, current location of an end-user, proximity between the end-user and the service delivery peer at the time a request for service comes, time of the day, pick up location and destination location in case of cab service, expected effort and expected cost to be incurred by the service delivery peer, and a demand and supply gap provided to the service delivery terminal [102]. In an embodiment, in case of a cab service, the service delivery peer may personalize the at least one dynamic content by modifying the at least one dynamic content, such as the price for the service and quality of the service, quantum of the service and may include preferences for, maximum distance the service delivery peer is willing to travel to drop an end-user, distance of pick up location from the service delivery peer's location at the time of a request, validity time, and a number of service delivery peers and other end-users requesting for service in an area in the vicinity of the location of the end-user or the service delivery peer. In yet another embodiment, the at least one dynamic content of the service may be based on inputs which could be modified by the central controller [106], the service delivery peer, or the service aggregator [104] to whom the service delivery peer is attached to.

Further, at step 210, the at least one service provider terminal [102] transmits the at least one dynamic content set by the at least one service delivery peer to the central controller [106].

Furthermore, at step 212, the central controller [106] receives a request for availing the at least one service from the at least one at least one end-user through at least one user device [110]. In an embodiment, the end-user may provide one or more constraints along with the request for the at least one service or the at least one service delivery peer, wherein the constraints comprise price estimate for the requested service, quality of the service provided by the at least one service delivery terminal.

At step 214, the central controller [106] performs a comparison function using a comparison engine (not shown) between the request and one of the at least one dynamic content determined by the central controller [106] or the at least one modified dynamic content to obtain at least one optimal dynamic content. At step 216, the central controller [106] transmits the at least one optimal dynamic content to the at least one user device [110] requesting the at least one service. In one embodiment, the central controller [106] identifies the service delivery peers present in the vicinity of the location of the end-user, the at least one optimal dynamic content which satisfies the request from the end-user, and accordingly, displays the corresponding at least one optimal dynamic content provided by them to the user device [110]. In one embodiment, the at least one optimal dynamic content provided to the end-user may include at least one label, such as a label for price of service and the time to complete the service, label for a price of service and rating of the service provided by the service delivery peers quoting the price, label for a price of service, and time to initiate service.

In an exemplary embodiment, the central controller [106] receives information from various service delivery peers about their availability in various locations. The service delivery peers in the present embodiment refer to the cabs or cab drivers. The central controller [106] determines the at least one dynamic content including a recommended price and a price range limit on the basis of first and second sets of parameters including parameters such as user accepted price for earlier cab services similar to the presently requested cab service, demand and supply gap, and price (in terms of rate per kilometer) submitted by the drivers. The at least one dynamic content is then transmitted to the service delivery peers. Pursuant to receiving the at least one dynamic content determined and transmitted by the central controller [106], the service delivery peer decides if the dynamic content can be accepted. For example, the service delivery peer decides whether to provide service for the price and other conditions recommended by the central controller [106] or to provide a new dynamic content value, such as price and a plurality of preferences including, but not limited to, destination, distance of pickup from current location, validity time, number of service delivery peers, other end-users requesting for service in vicinity, etc. When the end-user then sends a request for availing a cab service to a service aggregator [104] through a user device [110], the end-user may provide the details of the pickup location, drop location, the time for pickup, and other constraints, such as type of cab required, as a part of the request through an I/O interface of the user device [110]. The central controller [106] then performs a comparison between the at least one dynamic content accepted/modified by each of the at least one service delivery peer and the request received from the end-user, identifies at least one optimal dynamic content, and provides the details of the at least one dynamic content, along with the at least service provider to the end-user. Additionally, the end-user may compute a total price for the service requested by the end-user, such as the total price for providing cab service from the pickup location to the destination location based on the rate per kilometer provided by the at least one service delivery terminal [102]. The end-user is then enabled to make a selection from the options comprising the at least one optimal dynamic content transmitted to it from the available service delivery peers.

In an embodiment, the end-user is presented with information about the dynamic content received from the available service delivery peers including, but not limited to, a service delivery peer offering the fastest delivery of service, a service delivery peer offering the cheapest delivery of service, a service delivery peer offering the highest price for the requested service, and a service delivery peer offering the best quality, such as best car in case of a cab service. The selection made by the user of the particular cab the user wants to avail is transmitted over the network to the corresponding cab driver through the cab driver's service delivery terminal [102]. The service delivery terminal [102] receives the details of the end-user request to enable the service delivery peer to render the requested service to the end-user.

Figure 3:
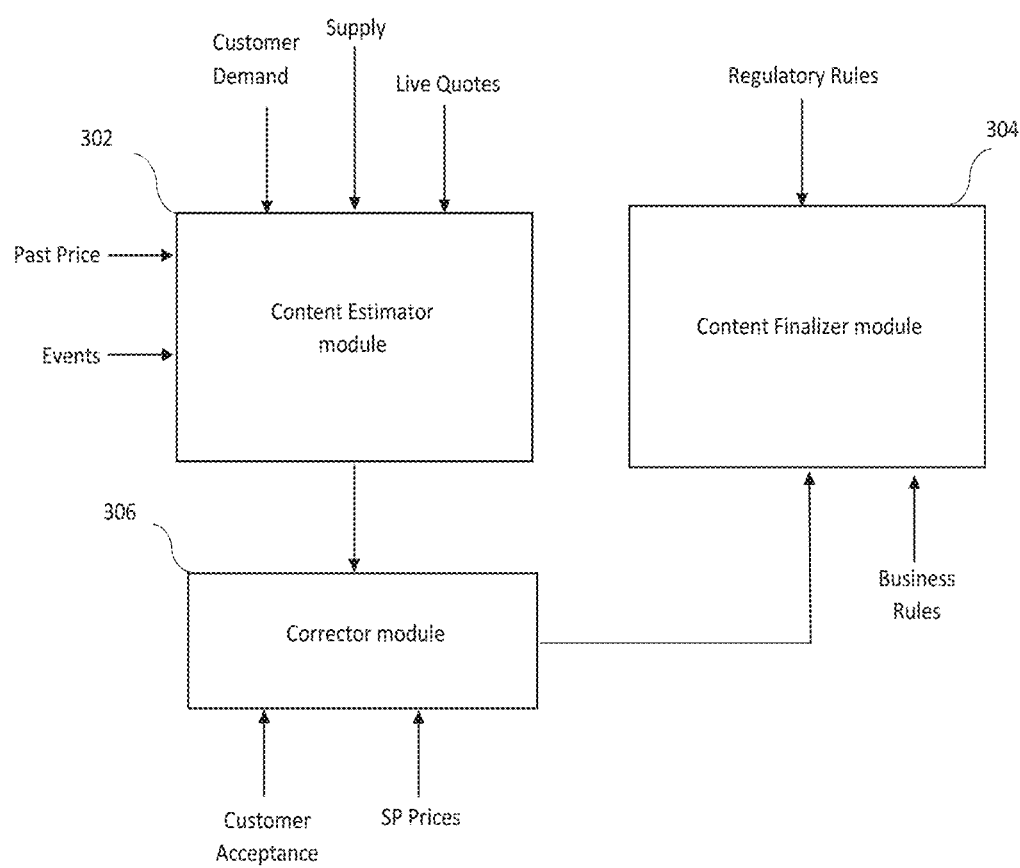
FIG. 3 illustrates an exemplary block diagram for determining at least one dynamic content of the service, in accordance with an exemplary embodiment of the present disclosure

As illustrated in FIG. 3, the present disclosure encompasses a process for determining a recommended content of the service. The process for determining the recommended content of the service is implemented using the system as illustrated in FIG. 1. The process for determining the dynamic content of the service is essentially carried out by a content estimator module [302], a corrector module [304], and a content finalizer module [306].

The content estimator module [302] estimates at least one dynamic content based on the past content, i.e., content values accepted by the end-users previously, live content values, i.e., content values received from one or more service delivery peers in real-time, demand from end-users, supply of the one or more available service delivery peers, and the events which may impact the content estimation. In an embodiment, the at least dynamic one content relates to price, and, in case of booking a cab, estimation of price is based on past data, such as past prices quoted by the one or more service delivery peers and accepted by the end-users in a recent time period such as a period between 2 hours to 30 weeks, price quoted by the one or more service delivery peers in real-time when the request for service from the end-user is provided, demand and supply analysis of the service, and any event which may impact the price estimation, such as during festival times, sports event, political rallies, etc.

Subsequently, the output of the step performed by content estimator module [302], i.e., the at least one estimated content is corrected by a corrector module [304] for end-user acceptance on the basis a self-learning mechanism, wherein the corrector module 304 runs on an auto-update basis and corrects the output of price estimator on the basis of at least the content values previously accepted by the end-users in the past for a service requested at the moment and the content values provide by the service delivery peers in real-time. In an embodiment, the corrector module [304] stores the end-user accepted prices in the past and the prices provided by the one or more service delivery peers in real time or at periodic intervals.

Further, the at least one corrected content is finalized by a content finalizer module [306] using validation with custom rules such as any regulatory rules and business rules. The regulatory and business rules may include the upper and lower limit of the price for the service. The regulatory rules may be defined by the Government, and the business rules may be defined by the service aggregator [104]. The central controller [106] fetches the regulatory rules and the business rules from the content server [108] over a network. In one embodiment, the central controller may have the regulatory rules and the business rules stored in a memory within the central controller [106]. The finalized content is then transmitted dynamically to the one or more service delivery peer through one or more service delivery terminals [102].

Figure 4A:
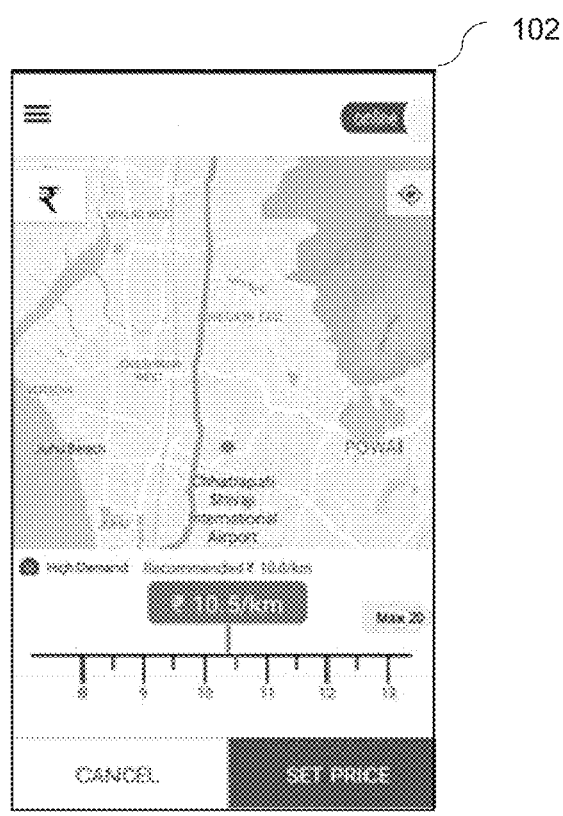
FIGS. 4A and 4B illustrate exemplary user interfaces displayed on a service delivery terminal for providing content for a real-time service to be delivered, in accordance with exemplary embodiments of the present disclosure.
Figure 4B:
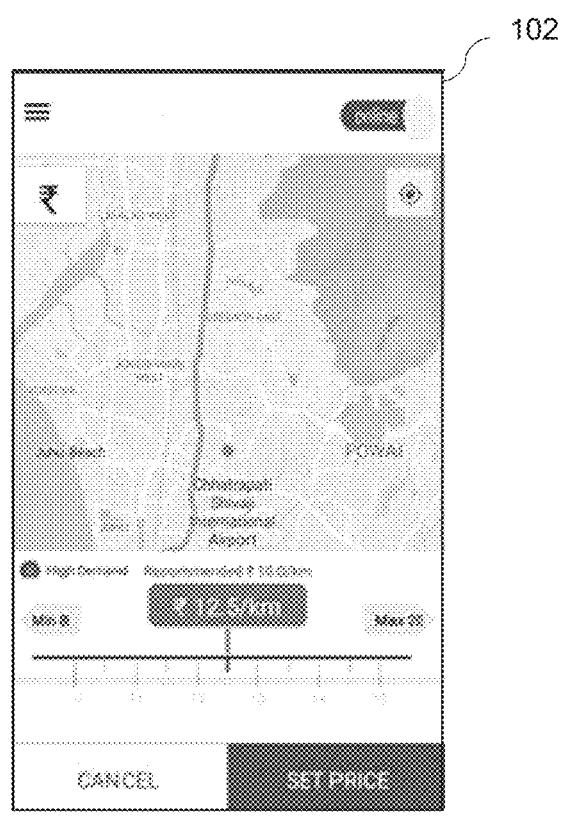

FIGS. 4A and 4B illustrate exemplary user interfaces displayed to a service delivery peer to provide content for the service to be delivered. In the present example, the FIGS. 4A and 4B are in the context of a cab booking service. The exemplary user interfaces are provided to the service delivery peer through a display of the service delivery terminal [102] operated by the service delivery peer. The service delivery terminal [102] enable the service delivery peer to view at least one request for a service, and the limited details of the service for the service delivery peer to accept or modify at least one dynamic content provided by the service delivery peer.

FIGS. 4A and 4B illustrate graphical user interfaces exhibited on the service delivery terminal [102] indicating price on a scale. The service delivery peer is enabled to choose price content dynamically on the scale. In FIG. 4A, the service delivery peer is provided with a recommended price of INR 10 per kilometer and an upper threshold of INR 20 per kilometer. The service delivery peer has selected a price of INR 10.5 per kilometer and the graphical user interface is shown prompting the service delivery peer to set the selected price. FIG. 4B illustrates a graphical user interface wherein the service delivery peer is provided with a recommended price of INR 12.5 per kilometer and a price range with a lower threshold of INR 8 per kilometer and an upper threshold of INR 20 per kilometer. The service delivery peer has selected a price of INR 12.5 per kilometer.

Figure 5A:
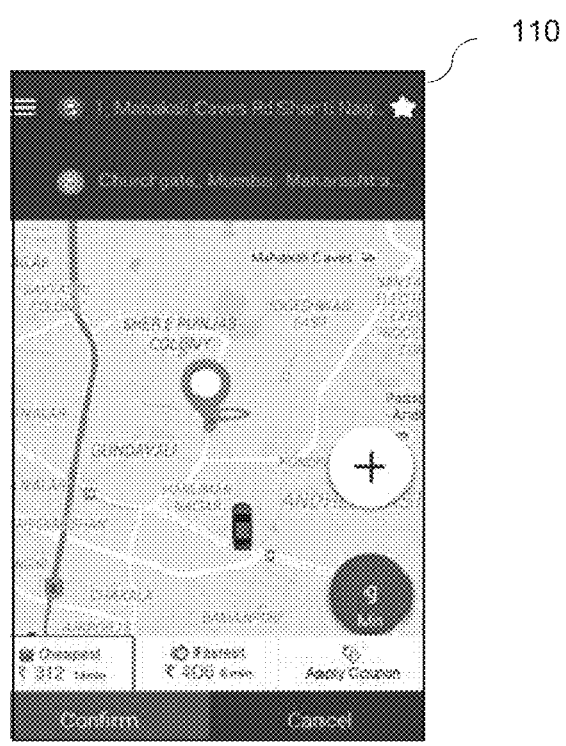
FIGS. 5A, 5B, 5C, 5D, 5E, and 5F illustrate exemplary user interfaces displayed on a user device requesting a real-time service, in accordance with exemplary embodiments of the present disclosure.
Figure 5B:
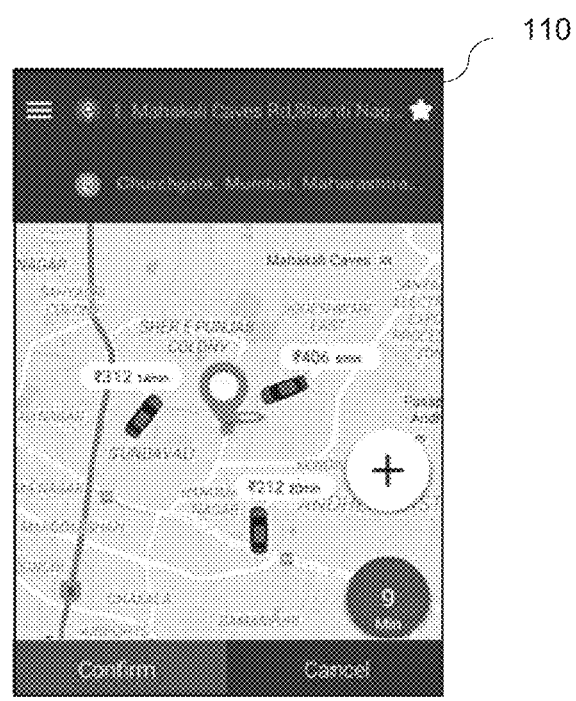
Figure 5C:
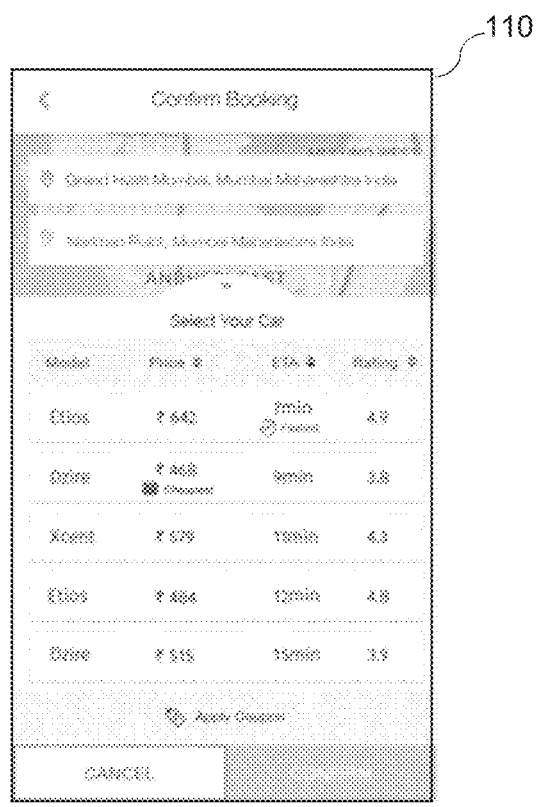

FIGS. 5A, 5B, 5C, and 5D illustrate exemplary user interfaces displayed to an end-user requesting a real-world service. In the present example, FIGS. 5A, 5B, and 5C are in the context of a cab booking service. The exemplary user interfaces are provided to the end-users through a display of the user devices [110].

FIG. 5A illustrates a graphical user interface exhibited on the user device [110] providing the dynamic content fetched by the central controller [106]. In an embodiment, FIG. 5A illustrates the dynamic content with the rate and time taken to deliver the service labels, i.e., a service delivery peer charging the least price for a service (i.e., pick-up and drop at a destination location), the time taken by the service delivery peer to complete the service and another service delivery peer taking the least amount of time to deliver the service, and the price for the same.

FIG. 5B illustrates a graphical user interface exhibited on the user device [110] on the basis of the selection made by the end-user. In the present example, the end-user selected the service delivery peer which provided the cheapest price for the service.

FIG. 5C illustrates a graphical interface exhibited on the user device [110] indicating the at least one dynamic content provided by the service delivery terminals [102] via the central controller, the at least one dynamic content comprising the model of the car, the corresponding price for the cab service to the destination as quoted by the service delivery peers in the vicinity of the location of the end-user requesting for the service of cab booking, an estimated time of arrival, and the rating of the corresponding service delivery peer.

Figure 5D:
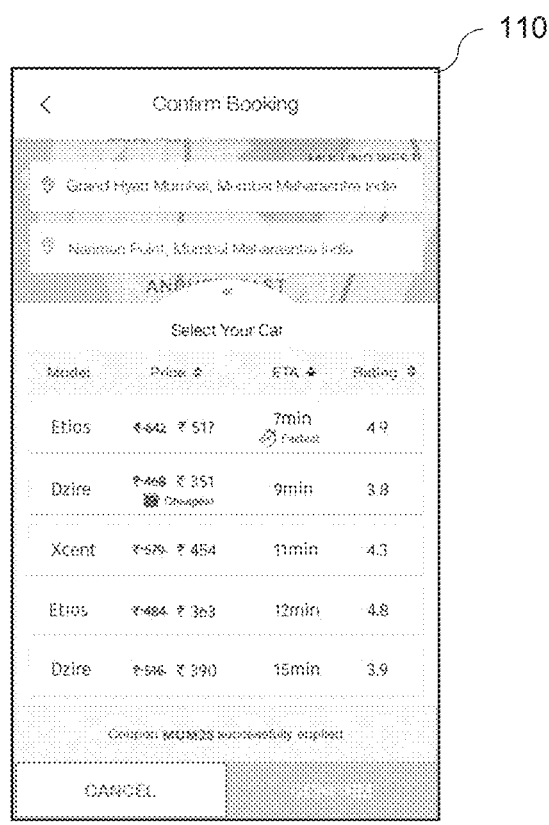

FIG. 5D illustrates a graphical interface exhibited on the user device [100], wherein the end-user is enabled to apply a coupon and avail a discount on the price quoted by the service delivery peer selected by the end-user.

Figure 5E:
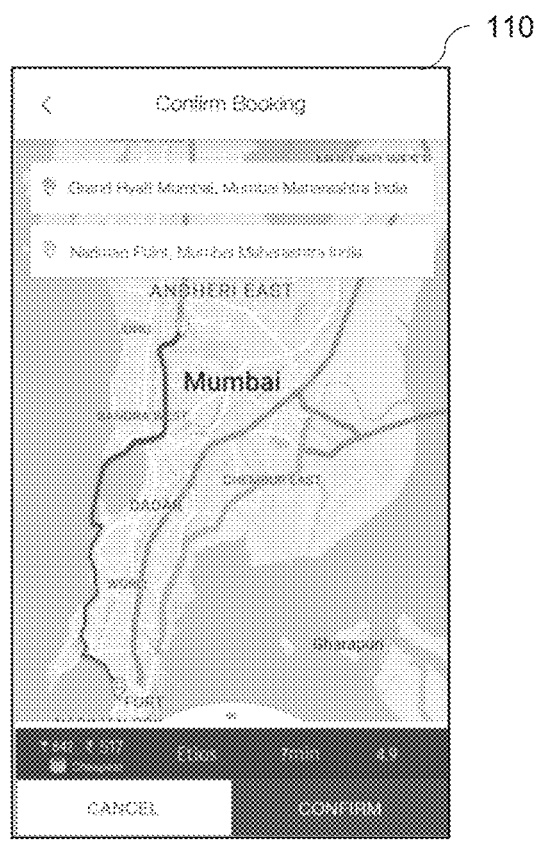

FIG. 5E illustrates a graphical interface exhibited on the user device [100], wherein the end-user is provided with a discounted price after the coupon is applied.

Figure 5F:
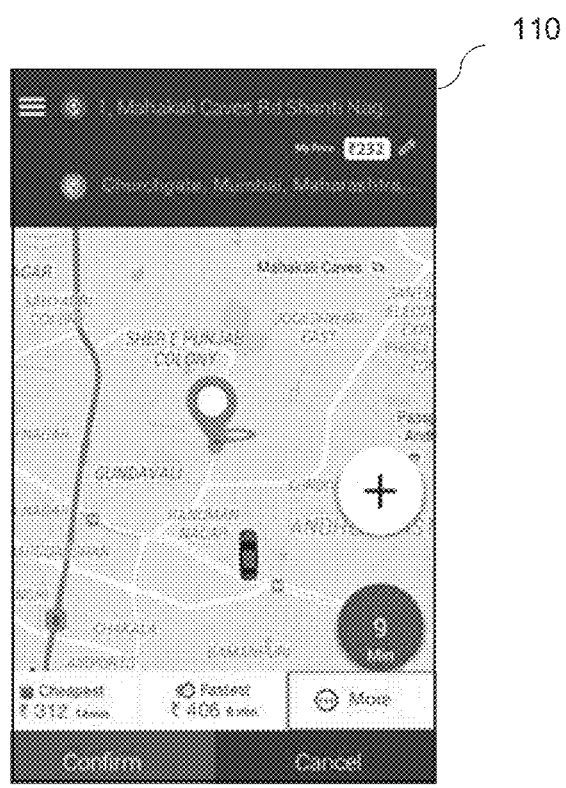

FIG. 5F illustrates a graphical interface exhibited on the user device [110], wherein the end-user can provide his preferences in terms of the content, such as the price for the service of cab booking for a specific distance.

As may be apparent from the above description of disclosed methods and systems for detecting a state of a vehicle, this approach provides an alternate solution to enable delivery of dynamic content related to real-time services to end-users.

It will be appreciated by those skilled in the art that the system and method described hereinabove helps in real-time decision making both by the service delivery peers and the end-users. In one embodiment, the system, method, and computer-readable medium encompassed by the present disclosure may be used by service aggregators involved in running a range of services which fundamentally involve a demand and supply paradigm.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalent.

We claim:

1. A method for discovering and providing, in real-time, at least one service based on a demand for the at least one service and a supply available for the at least one service, the method comprising:

receiving a first set of parameters from at least one service delivery terminal and a second set of parameters from at least one content server having at least regulatory rules and business rules, wherein the first set of parameters and the second set of parameters are at least one of received in real-time and received periodically;

determining the at least one dynamic content of the at least one service based on the first set of parameters and the second set of parameters, wherein the at least one dynamic content relates to at least one of price, recommended value, quality, quantum, demand, location, ratings, delivery time;

transmitting the at least one dynamic content to the at least one service delivery terminal by a central controller;

modifying the at least one dynamic content to generate at least one modified dynamic content when the at least one dynamic content received from the central controller is not accepted by the at least one service delivery terminal;

transmitting, to the central controller by the at least one service delivery terminal over a network the at least one modified dynamic content;

receiving at least one request from at least one user device for using the at least one service by the central controller;

comparing the at least one request and the at least one modified dynamic content to determine at least one optimal dynamic content, wherein the at least one optimal dynamic content is generated for at least one available service delivery terminal associated with the selected modified dynamic content; and transmitting the determined at least one optimal dynamic content to the at least one user device over the network and the at least one available service delivery terminal.

2. The method according to claim 1, wherein the first set of parameters comprise at least one of (i) availability of the at least one service delivery terminal at a particular location, (ii) price for the at least one service submitted by the at least one service delivery terminal, (iii) distance between the at least one service delivery terminal and a user device of the at least one user device, and (iv) closeness to a drop location.

3. The method according to claim 1, wherein the second set of parameters comprise at least one of (i) a demand and supply gap for the at least one service at said particular location, (ii) content previously accepted by end-users for the at least one service, (iii) intra-day shift in a demand and supply due to local conditions, (iv) supply of service delivery peers, (v) at least one event impacting the price of the at least one service, and (vi) custom rules.

4. The method as according to claim 1, wherein at least one end-user makes a selection of the at least one optimal dynamic content from the central controller through the at least one user device.

5. The method according to claim 4, further comprising:
capturing the selection made by the at least one end-user; and
transmitting the at least one request from at least one user device to the at least one service delivery terminal corresponding to the selected at least one optimal dynamic content.

6. The method according to claim 1, wherein at least one of the at least one dynamic content, at least one modified dynamic content, and the at least one optimal dynamic content further includes (i) a quality of service, (ii) a quantum of service, (iii) ratings of available at least one service delivery peers corresponding to the at least one service delivery terminal, and (iv) an expected time to be taken to initiate the service delivery.

7. The method according to claim 1, wherein the request from the at least one user device comprises at least one constraint, the at least one constraint including one or more of (i) a price estimate for the requested service, and (ii) quality of the at least one service provided by the at least one service delivery terminal.

8. The method according to claim 1, further comprising:
determining the at least one dynamic content of the at least one service, which comprises:
estimating the at least dynamic content using a content estimator module based on at least one parameter of one or more of the first set of parameters and the second set of parameters;
correcting the at least dynamic content using a corrector module for acceptance by the end-user; and
finalizing the at least one dynamic content using a content finalizer module using validation with at least one custom rule.

9. A system for discovering and providing, in real-time, at least one service based on a demand for the at least one service and a supply available for the at least one service, the system comprising:
a central controller configured to:
receive a first set of parameters from at least one service delivery terminal and a second set of parameters from at least one content server having at least regulatory rules and business rules, wherein the first set of parameters and the second set of parameters are at least one of received in real-time and received periodically;
determine the at least one dynamic content of the at least one service based on the first set of parameters and the second set of parameters, wherein the at least one dynamic content relates to at least one of price recommended value, quality, quantum, demand, location, ratings, delivery time; and
transmit the at least one dynamic content to the at least one service delivery terminal by a central controller; and
a service delivery terminal configured to:
receive and exhibit the at least one dynamic content from the central controller;
modify the at least one dynamic content to generate at least one modified dynamic content when the at least one dynamic content received from the central controller is not accepted; and
transmit to the central controller the at least one modified dynamic content,
wherein the central controller is further configured to:
receive at least one request from at least one user device for using the at least one service;
compare the at least one request and the at least one modified dynamic content to determine at least one optimal dynamic content, wherein the at least one optimal dynamic content is generated for at least one available service delivery terminal associated with the selected modified dynamic content; and
transmit the determined at least one optimal dynamic content to the at least one user device over a network and the at least one available service delivery terminal.

10. The system according to claim 9, wherein the first set of parameters comprise at least one of (i) availability of the at least one service delivery terminal at a particular location, (ii) price for the at least one service submitted by the at least one service delivery terminal, (iii) distance between the at least one service delivery terminal and a user device of the at least one user device, and (iv) closeness to a drop location.

11. The system according to claim 9, wherein the second set of parameters comprise at least one of (i) a demand and supply gap for the at least one service at said particular location, (ii) content previously accepted by end-users for the at least one service, (iii) intra-day shift in a demand and supply due to local conditions, (iv) supply of service delivery peers, (v) at least one event impacting the price of the at least one service, and (vi) custom rules.

12. The system according to claim 9, wherein at least one end-user makes a selection of the at least one optimal dynamic content from the central controller through the at least one user device.

13. The system according to claim 12, wherein the central controller is further configured to:
capture the selection made by the at least one end-user; and
transmit the at least one request from at least one user device to the at least one service delivery terminal corresponding to the selected at least one optimal dynamic content.

14. The system according to claim 9, wherein at least one of the at least one dynamic content, at least one modified dynamic content, and the at least one optimal dynamic content further includes (i) a quality of service, (ii) a quantum of service, (iii) ratings of available at least one service delivery peers corresponding to the at least one service delivery terminal, and (iv) an expected time to be taken to initiate the service delivery.

15. The system according to claim 9, wherein the request from the at least one user device comprises at least one constraint, the at least one constraint including one or more of (i) a price estimate for the requested service, and (ii) quality of the at least one service provided by the at least one service delivery terminal.

16. The system according to claim 9, wherein the central controller is further configured to:
determine the at least one dynamic content of the at least one service, which comprises:
estimate the at least dynamic content using a content estimator module based on at least one parameter of one or more of the first set of parameters and the second set of parameters;
correct the at least dynamic content using a corrector module for acceptance by the end-user; and
finalize the at least one dynamic content using a content finalizer module using validation with at least one custom rule.

17. A non-transitory computer-readable medium storing instructions that, when executed by a computer, cause the computer to perform a method for discovering and providing, in real-time, at least one service based on a demand for the at least one service and a supply available for the at least one service; the method including:
receiving a first set of parameters from at least one service delivery terminal and a second set of parameters from at least one content server having at least regulatory rules and business rules, wherein the first set of parameters and the second set of parameters are at least one of received in real-time and received periodically;
determining the at least one dynamic content of the at least one service based on the first set of parameters and the second set of parameters, wherein the at least one dynamic content relates to at least one of price recommended value, quality, quantum, demand, location, ratings, delivery time, and a combination thereof;
transmitting the at least one dynamic content to the at least one service delivery terminal by a central controller;
modifying the at least one dynamic content to generate at least one modified dynamic content when the at least one dynamic content received from the central controller is not accepted by the at least one service delivery terminal;
transmitting to the central controller by the at least one service delivery terminal over a network, the at least one modified dynamic content;
receiving at least one request from at least one user device for using the at least one service by the central controller;
comparing the at least one request and the at least one modified dynamic content to determine at least one optimal dynamic content, wherein the at least one optimal dynamic content is generated for at least one available service delivery terminal associated with the selected modified dynamic content; and
transmitting the determined at least one optimal dynamic content to the at least one user device over the network and the at least one available service delivery terminal.

18. The computer-readable medium according to claim 17, wherein the first set of parameters comprise at least one of (i) availability of the at least one service delivery terminal at a particular location, (ii) price for the at least one service submitted by the at least one service delivery terminal, (iii) distance between the at least one service delivery terminal and a user device of the at least one user device, and (iv) closeness to a drop location.

19. The computer-readable medium according to claim 17, wherein the second set of parameters comprise at least one of (i) a demand and supply gap for the at least one service at said particular location, (ii) content previously accepted by end-users for the at least one service, (iii) intra-day shift in a demand and supply due to local conditions, (iv) supply of service delivery peers, (v) at least one event impacting the price of the at least one service, and (vi) custom rules.

20. The computer-readable medium according to claim 17, wherein at least one of the at least one dynamic content, at least one modified dynamic content, and the at least one optimal dynamic content further includes (i) a quality of service, (ii) a quantum of service, (iii) ratings of available at least one service delivery peers corresponding to the at least one service delivery terminal, and (iv) an expected time to be taken to initiate the service delivery.

* * * * *